(No Model.)  3 Sheets—Sheet 1.
V. W. MASON, Jr.
MACHINE FOR HOBBING WORM GEARS.
No. 537,214.  Patented Apr. 9, 1895.
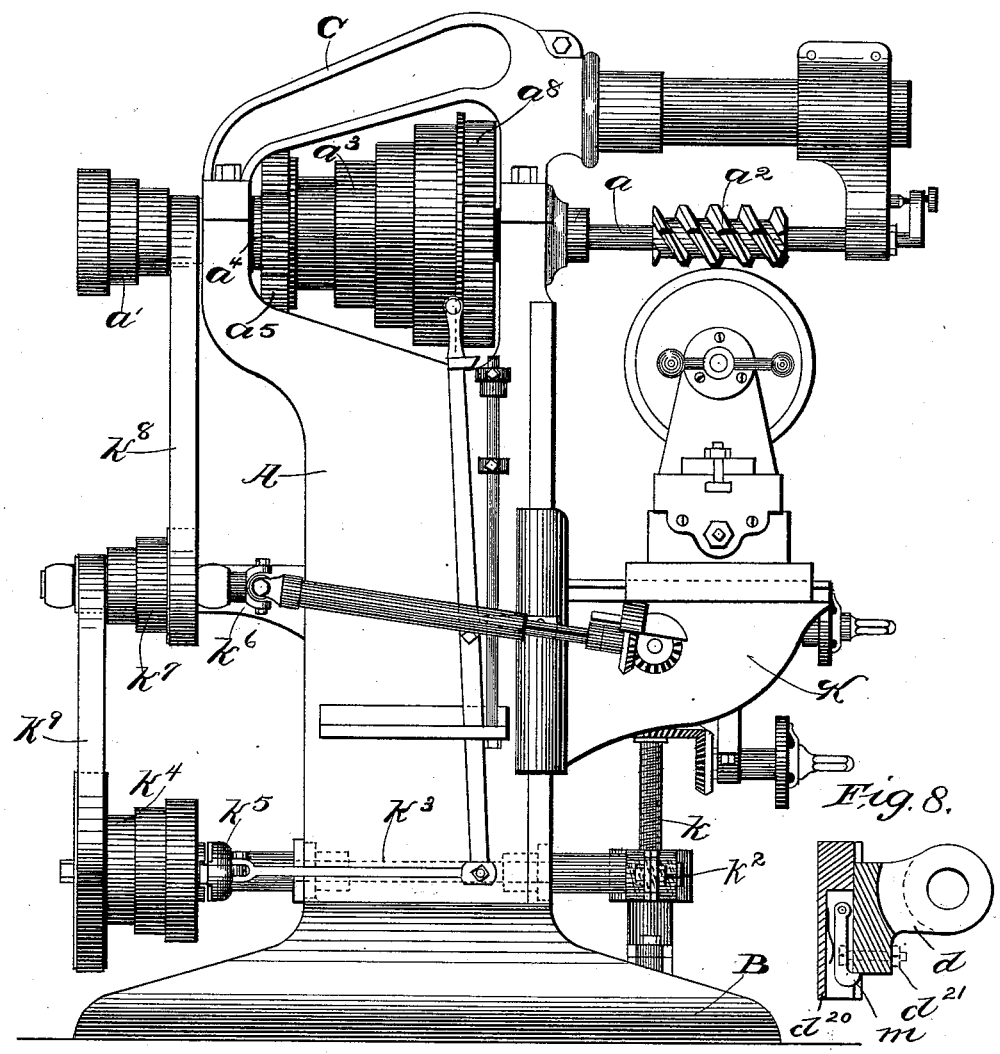
Fig. 1.
Fig. 8.
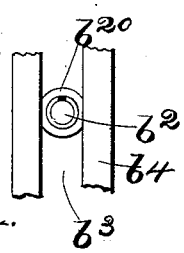
Fig. 7.
WITNESSES.
Frederick S Pinkham.
Charles B Crocker.
INVENTOR.
Volney W. Mason Jr.
by B. J. Noyes,
Atty.

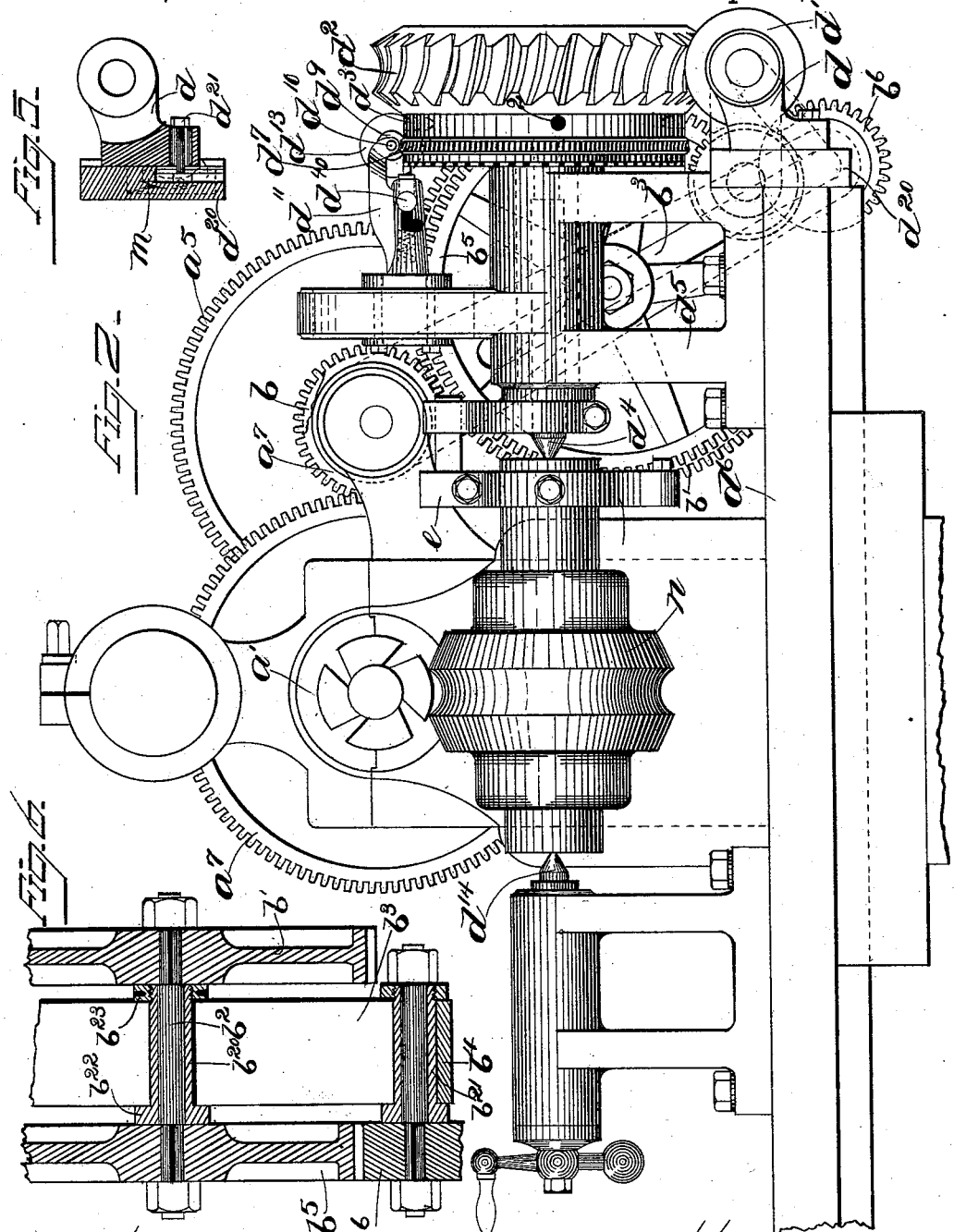

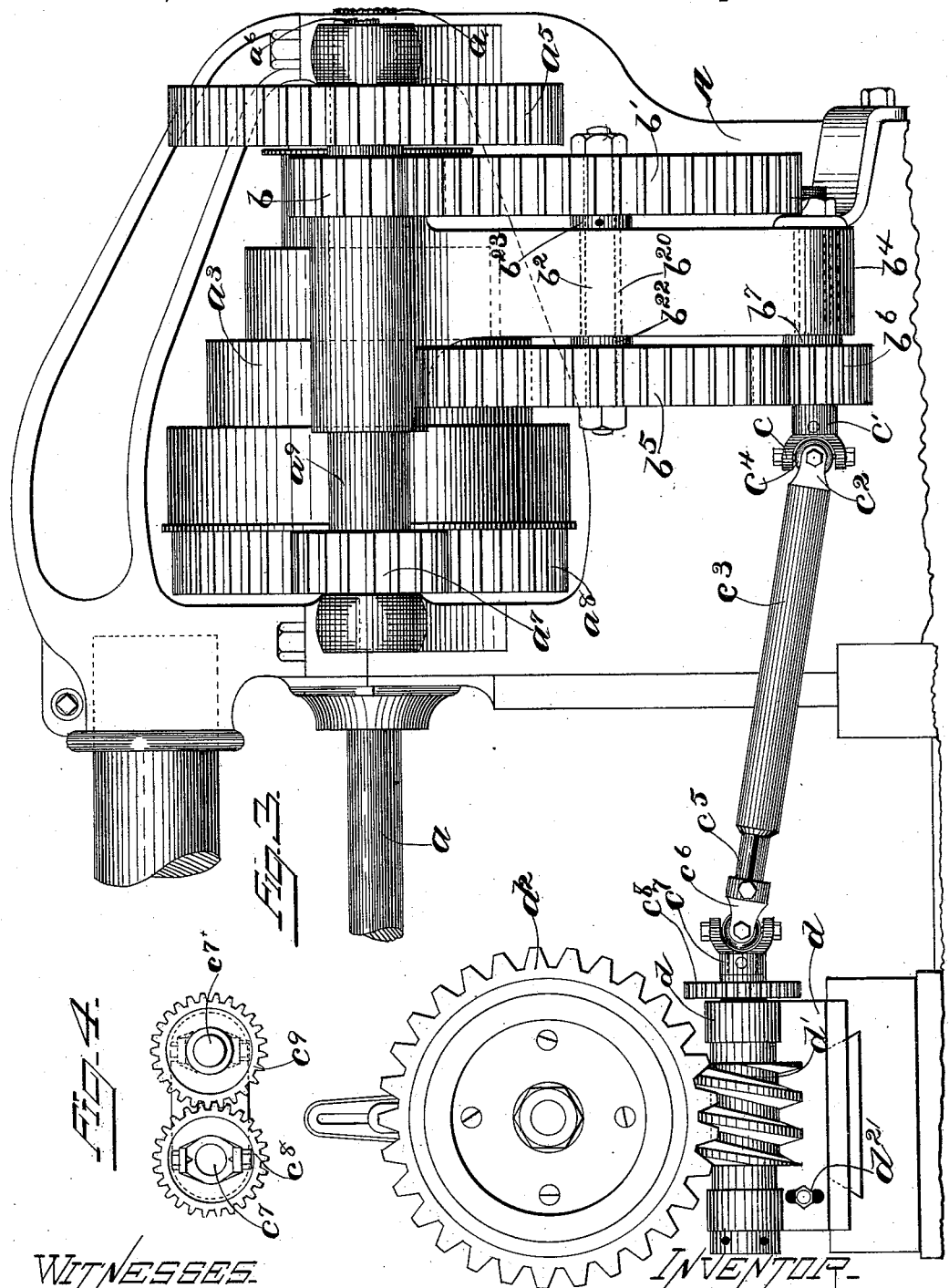

UNITED STATES PATENT OFFICE.

VOLNEY W. MASON, JR., OF HYDE PARK, MASSACHUSETTS.

MACHINE FOR HOBBING WORM-GEARS.

SPECIFICATION forming part of Letters Patent No. 537,214, dated April 9, 1895.

Application filed January 25, 1894. Serial No. 498,033. (No model.)

*To all whom it may concern:*

Be it known that I, VOLNEY W. MASON, Jr., of Hyde Park, county of Norfolk, State of Massachusetts, have invented an Improvement in Machines for Hobbing Worm-Gears, of which the following description, in connection with the accompanying drawings, is a specification, like letters and figures on the drawings representing like parts.

Heretofore worm gears have been hobbed by a continuously rotating hob engaging the teeth of the gear which is held loosely between the center spindles, the gear being rotated or dragged round by the hob, as the latter sinks radially into the work. The constant dragging action of the hob against the teeth of the gear results in forming or shaping the teeth incorrectly, more or less varying their pitch, and also rapidly wears away one side of the hob. Worm gears have also been cut in substantially this same way, the teeth being previously generated by casting, or "roughing out" with an ordinary cutting tool.

This invention has for its object to construct a machine especially adapted for hobbing or cutting worm gears, whereby the defects above noted may be overcome, and consists essentially in so constructing and arranging the various parts of the machine that a continuously rotating hob or cutting tool is made to gradually sink radially into a positively rotated blank or worm gear, said blank or gear rotating at a definite ratio with relation to the cutting tool, according to the number of teeth to be cut or hobbed.

In carrying out this invention the shaft or arbor carrying the hob or cutting tool is rotated at a certain constant speed, which may be varied as desired, and the worm gear to be hobbed or blank to be cut to produce a worm gear is likewise rotated at a certain constant speed, the ratio of one to the other varying according to the number of teeth to be cut in the blank, or the number of teeth in the worm gear to be hobbed. Center spindles carry the worm gear or blank, one or both of which are rotated by suitable gearing connected with and positively actuated by the means employed for rotating the hob-carrying shaft, as for instance it may be connected with the usual back gearing of the machine so as to insure the gear and cutting tool being rotated at a certain ratio, one with relation to the other. The spindle driving mechanism or gearing is adjustable for the different speeds which it is desired to rotate the gear or blank. In addition to the cutting tool and driving spindle of the blank or worm gear, each positively rotating, the knee or support carrying said driving spindle is made vertically movable, that the cutting tool may sink radially into the blank or gear as it revolves, and mechanism is preferably provided for so raising the knee which is connected with the driving mechanism of the other parts, in order that the knee may be raised automatically. The spindle driving mechanism is such as to permit the knee to rise and fall vertically without disarranging its operative connection with the hob-carrying shaft, so that the relative ratios of speed may be continuously maintained. The head or frame carrying the driving spindle is secured to a table which is adapted to be moved horizontally on a carriage which is likewise movable horizontally, but at right angles to the horizontal movement of the table, said carriage being supported by or upon the vertically moving knee. The spindle driving mechanism or gearing is adapted to be disconnected from the spindle or head carrying it, so that said head may be utilized for other work than cutting or hobbing worm gears.

My device is herein represented as an attachment to an ordinary milling machine, whereby other work of a general machine shop nature may be done, when the hobbing or gear cutting attachment is disconnected therefrom.

Figure 1 shows a left hand side elevation of a machine for hobbing or cutting worm gears, embodying this invention; Fig. 2, a front elevation on an enlarged scale of the head and adjoining parts of the machine; Fig. 3, a right hand side elevation of the head and adjoining parts shown in Fig. 2, and Figs. 4, 5, 6, 7 and 8, details to be referred to.

The standard or column A mounted upon a base B and the arch C, are of any usual or suitable construction to support the working parts, and together with the knee K, which is adapted to slide vertically in a suitable guideway on the column A, are as usual in milling machines. A vertical feeding screw $k$ is provided for the knee K which has at or near its lower end a worm wheel which is engaged and driven by a worm $k^2$, see dotted lines Fig. 1, secured to a shaft $k^3$, passing through the column A, and having upon its rear end a cone pulley $k^4$, which is thrown into and out of engagement with the shaft $k^3$ by a suitable clutch $k^5$. On a stand or bracket $k^6$, secured to and projecting rearwardly from the column A, is mounted an intermediate cone pulley $k^7$, which is in alignment with but above the cone pulley $k^4$. On the upper part of the frame work of the machine a shaft or arbor $a$ has its bearings and has secured to its rear end a cone pulley $a'$, in alignment with but above the cone pulley $k^7$. The cone pulleys $a'$, $k^7$, $k^4$, are connected by belts $k^8$, $k^9$, and by their employment the speed of the worm shaft $k^3$ may be varied. The shaft $a$ carries a hob $a^2$ or other cutting tool which may be of any usual or suitable construction. A cone pulley $a^3$ is mounted loosely on said shaft $a$, which receives upon it the driving belt, and a pinion $a^4$ also mounted loosely upon the shaft $a$, and made fast to and driven by said cone pulley $a^3$, which engages a toothed wheel $a^5$, secured to a quill or sleeve $a^9$, mounted upon an eccentric shaft $a^6$ turning in suitable bearings on the frame, a pinion $a^7$ being also secured to said quill $a^9$ thereby rotating in unison with the toothed wheel $a^5$. The pinion $a^7$ engages the spindle gear $a^8$ fixed to the shaft $a$. By turning the eccentric shaft $a^6$ the toothed wheel $a^5$ and pinion $a^7$ are thrown into and out of operative engagement with the pinion $a^4$ and gear $a^8$ on the shaft $a$. This driving mechanism or gearing is common in milling machines, and is herein termed the back-gearing thereof, and in different forms of milling machines is slightly differently constructed, yet capable of accomplishing substantially the same results. The hob or cutter-carrying shaft $a$ is rotated by the said back-gearing.

Upon the quill $a^9$ on the eccentric shaft $a^6$ a pinion $b$ is secured which engages a toothed gear $b'$ secured to a short shaft $b^2$, see dotted lines Figs. 3, 6, and 7, having its bearings in a box $b^{20}$, placed in a slot $b^3$, formed longitudinally in an arm $b^4$, which is loosely mounted upon the quill $a^9$, and thereby movable on the axis of the back-gearing shaft $a^6$. The toothed gear $b'$ is the prime gear borne by the swinging arm $b^4$ and is engaged and driven by the back-gearing of the machine. The short shaft $b^2$, passes through the box $b^{20}$, and has secured to its oppositely projecting end a toothed gear $b^5$, which engages a pinion $b^6$, secured to a short shaft $b^7$, see dotted lines Figs. 3, 6, and 7, contained in a box $b^{21}$, likewise placed in the longitudinal slot $b^3$, in said arm $b^4$. The boxes $b^{20}$, $b^{21}$, are or may be made substantially alike, each comprising a tubular bushing having flattened sides to be received within and moved vertically in the slot $b^3$, and having at one end a flange $b^{22}$, and at the other end screw threads adapted to receive a binding nut $b^{23}$, provided with spanner holes by means of which it may be turned to frictionally secure the box at any desired part of the slot $b^3$.

By providing adjustable shafts $b^2$, $b^7$, it will be seen that the intermediate gears $b'$, $b^5$, $b^6$, may be removed and others of different diameter substituted for purposes to be hereinafter explained, or such changeable gearing may be varied to suit the work which is to be done.

A yoke $c$ is secured to a sleeve $c'$ pinned or otherwise secured to the shaft $b^7$, or said yoke may be secured directly to the hub of the pinion $b^6$, and a yoke $c^2$, on the end of a tubular rod or shaft $c^3$, is placed adjacent and at right angles to the yoke $c$, and a ball or intermediate piece $c^4$, is interposed between and connected with said yokes by suitable pins constituting a universal joint connection between the tubular rod or shaft $c^3$, and the shaft $b^7$. Contained within and projecting from the opposite end of said rod or shaft $c^3$, is a spline rod or shaft $c^5$ having a telescopic movement with relation to the tubular rod or shaft $c^3$, and to the end of said rod or shaft $c^5$ a universal joint connection similar to that just described is provided, connecting it with a sleeve $c^6$ pinned to the end of a worm shaft $c^7$. See dotted lines Fig. 3. Fixed to said worm shaft $c^7$ is a toothed gear $c^8$ and beside it, and in mesh with it, is a toothed gear $c^9$, see Fig. 4, mounted loosely upon a stud, said gear $c^9$ having a hub upon which the sleeve $c^6$ may be pinned when desired, so that the worm shaft $c^7$ may be turned in one or the other direction according to whether the sleeve is pinned directly to the worm shaft or to the hub of the gear $c^9$. The worm shaft $c^7$ has its bearings in a bracket $d$, adjustably secured to one end of the framework, and bears a worm $d'$, which engages the worm wheel $d^2$ secured to a disk $d^3$, which is fixed to a center spindle $d^4$ having its bearings in a head $d^5$ which is dovetailed into or otherwise secured to the table $d^6$.

The blank $n$ which may be a blank to be cut to form a worm gear, or a worm gear to be hobbed, is held between the center spindles $d^4$, and $d^{14}$, upon a suitable arbor, which is connected with the center spindle $d^4$ by means of a suitable clutch or dog $e$. The blank $n$ is driven constantly by the center spindle $d^4$, worm wheel $d^2$, worm $d'$, telescopic shaft connecting said worm with the pinion $b^6$, and the intermediate gearing connected with the back-gearing of the machine, while the hob or cutting tool is driven constantly by the shaft $a$, and the knee K is constantly raised by the feeding screw $k$. For worm wheels of different sizes the knee may be adjusted vertically, and for worm wheels having different numbers of teeth the intermediate gearing on the swinging arm $b^4$ will be changed as heretofore explained, so that the proper ratio may be obtained between the number of turns of the hob or cutting tool, and the number of teeth in the wheel to be hobbed or cut. As for example if the blank to be hobbed has fifty teeth, the blank will be turned exactly one revolution while the hob is turned fifty revolutions.

The worm wheel $d^2$ is detachably connected with the plate or disk $d^3$, so that worm wheels having different numbers of teeth may be substituted if a wider variation is required than can be obtained by the change of intermediate gearing, and furthermore if desired different worm wheels $d^2$ may be employed in lieu of changing the intermediate gearing.

It is obvious that the plate or disk $d^3$, may be omitted and the worm wheel $d^2$ secured directly to the spindle $d^4$, or said disk and worm wheel may be independently secured to the spindle.

The bracket $d$ is vertically adjustable upon a plate $d^{20}$, secured to the end of the head $d^5$, by a binding bolt $d^{21}$, and is provided with a suitable latch or limiting stop $m$, see Fig. 8 and dotted lines Fig. 5, which determines when it is adjusted so as to accurately mesh with the worm wheel $d^2$, and by pressing inward the latch and lowering said bracket the worm $d'$ is thrown out of mesh with the worm wheel $d^2$, in which position of the parts the apparatus may be used for other machine shop purposes. For such general machine shop work I have provided a worm wheel $d^7$ which is secured to the center spindle $d^4$, and for simplicity of construction the said worm wheel $d^7$ may be made integral with the disk $d^3$. A worm $d^9$ is secured upon a worm shaft $d^{10}$ having its bearings in a yoke or frame $d^{11}$, and a crank is or may be secured to said worm shaft, by means of which it may be turned, said crank moving over a fixed dial $d^{13}$. The worm $d^9$ engages and rotates the worm wheel $d^7$, and upon the face of said worm wheel $d^7$ a suitable number of teeth or notches are provided with which co-operate a suitable latch or detent $d^{40}$, for retaining said worm wheel in whatever fixed position it may be placed, so that either the series of notches or the worm wheel indicating device may be employed according to the work being done. The center spindle $d^4$, may be turned manually by a spanner which engages the spanner holes 2 in the disk $d^3$.

In lieu of the center spindles $d^4$, $d^{14}$, carrying the blank to be cut I may employ as an equivalent therefor, an arbor or any other suitable rotating device.

In lieu of employing cone pulleys $a'$, $k^7$, $k^4$, and connecting belts, the shaft $k^3$ may be connected with the shaft $a$ by gearing or any other suitable connecting mechanism, but I prefer to employ the belt mechanism shown because if for any reason the knee should be advancing or rising too fast as compared to the action of the cutter upon the work being done, said belts would slip before the cutter would be broken, thereby constituting a slip feeding mechanism for the knee.

I claim—

1. The combination with a cutter-carrying shaft, and back-gearing connected with and adapted to rotate said shaft, center spindles carrying the blank to be cut, a telescopic shaft connected by gearing with one of said spindles, a swinging arm bearing gears for turning said telescopic shaft, the prime gear of which is engaged and driven by the back-gearing which is connected with the cutter-carrying shaft, substantially as described.

2. The combination with a cutter-carrying shaft, back-gearing connected with and adapted to rotate the same, center spindles carrying the blank to be cut, a vertically moving knee supporting said center spindles, a telescopic shaft connected by gearing with one of said spindles, a swinging arm bearing gears for turning said telescopic shaft, the prime gear of which is engaged and driven by the back-gearing which is connected with the cutter-carrying shaft, substantially as described.

3. The combination with a cutter-carrying shaft, back-gearing connected with and adapted to rotate the same, center spindles carrying the blank to be cut, a vertically moving knee, a horizontally moving carriage on said knee supporting said center spindles, a telescopic shaft connected by gearing with one of said spindles, and moving toward and from the face of the machine, a swinging arm bearing gears for turning said telescopic shaft, the prime gear of which is engaged and driven by the back-gearing which is connected with the cutter-carrying shaft, substantially as described.

4. The combination with a cutter-carrying shaft, back-gearing connected with and adapted to rotate the same, center spindles carrying the blank to be cut, a vertically moving knee, a horizontally moving table supported by said knee supporting said center spindles, and moving across the face of the machine, a telescopic shaft connected by gearing with one of said spindles, a swinging arm bearing gears for turning said telescopic shaft, the prime gear of which is engaged and driven by the back-gearing which is connected with the cutter-carrying shaft, substantially as described.

5. The combination of a continuously rotating cutter-carrying shaft, a cutter rigidly secured thereto, center spindles carrying the blanks to be cut, means for rotating one of said center spindles at a proportionate ratio to the cutter-carrying shaft, according to the number of teeth to be cut in the blank, a support for said center spindles, and slip-feed mechanism for moving it vertically continuously, while the blank is being cut, in order that the cutting tool may gradually sink radially into the rotating blank, substantially as described.

6. The combination with the hob-carrying shaft, means for rotating it, center spindles carrying the blank to be cut, which turn on an axis at right angles to the axis of the hob-carrying shaft, gearing connected with and positively driven by the means employed for rotating the hob-carrying shaft for driving one of said spindles at a proportionate ratio to the hob-carrying shaft, a vertically moving knee and slip feeding mechanism therefor, comprising a feeding screw, a power driven shaft for rotating said feeding screw, connected therewith by gearing, a cone pulley on said shaft, a main cone pulley, and an intermediate cone pulley, and belts connecting said cone pulleys, substantially as described.

7. The combination with a cutter-carrying shaft, means for rotating it, center spindles carrying the blank to be cut, turning on an axis at right angles to the axis of the cutter-carrying shaft, gearing for driving one of said spindles, gear $c^8$ on one of the shafts of said gearing, gear $c^9$ in mesh therewith, a telescopic shaft adapted to be connected with said gearing or with the gear $c^9$, and intermediate gearing connecting said telescopic shaft with the means employed for rotating the cutter-carrying shaft, substantially as described.

8. The combination with the back-gearing of a milling machine, a cutter-carrying shaft driven by it, center spindles carrying the work to be done, turning on an axis at right angles to the axis of the cutter-carrying shaft, of an attachment interposed between said back-gearing of the machine, and one of said center spindles, whereby the latter is driven by the former at a proportionate ratio with relation to the cutter-carrying shaft, and means for throwing said gearing attachment into and out of action, substantially as described.

9. The combination of a cutter-carrrying shaft, means for rotating it, center spindles $d^{14}$, $d^4$, carrying the work to be done, worm wheel $d^2$ detachably connected with the spindle $d^4$, worm $d^8$ engaging it, and movable support therefor, telescopic shaft connected at one end with said worm $d^8$, and at the other end with the mechanism employed for rotating the cutter-carrying shaft, substantially as described.

10. The combination with the usual back gearing of a milling machine, and spindles carrying the work to be done, of an attachment comprising an arm supported upon the quill on the back gearing shaft, and adjustable on an axis coincident with the axis of said shaft, gears borne by said arm, and a telescopic shaft, one end of which is connected with the hub of one of said gears, and the other end of which is connected by gearing with one of the aforesaid spindles, operating to rotate it, substantially as described.

11. The combination with the usual back gearing of a milling machine, and spindles carrying the work to be done, of an attachment comprising an arm supported upon a quill on the back gearing shaft, and adjustable on an axis coincident with the axis of said back gearing shaft, gears adjustably connected with said arm, and a telescopic shaft, one end of which is connected with the hub of one of said gears, and the other end of which is connected by gearing with one of the aforesaid spindles, operating to rotate it, substantially as described.

12. The combination of a cutter-carrying shaft, means for rotating it, center spindles $d^{14}$, $d^4$, carrying the work to be done, gearing connecting the spindle $d^4$ with the mechanism employed for rotating the cutter-carrying shaft, whereby said spindle and cutter-carrying shafts are continuously revolved, parts of said gearing being movable into and out of cooperative relation with each other, a worm wheel $d^7$ on said spindle $d^4$, worm $d^9$, and means for turning it manually, substantially as described.

In testimony whereof I have signed my name to this specification in the presence of two subscribing witnesses.

VOLNEY W. MASON, JR.

Witnesses:
B. J. NOYES,
C. B. CROCKER.